United States Patent
Biedermann et al.

(10) Patent No.: US 6,574,315 B1
(45) Date of Patent: Jun. 3, 2003

(54) METHOD FOR CONTROLLING DATA TRANSMISSION IN A WIRELESS V.24 DATA TRANSMISSION SYSTEM OPERATING BETWEEN A DATA TERMINAL AND A DATA TRANSMISSION DEVICE FOR DATA TELECOMMUNICATION

(75) Inventors: Rolf Biedermann, Ahaus (DE); Diego Garcia Alfaro, Schenefeld (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/762,173

(22) PCT Filed: Aug. 4, 1999

(86) PCT No.: PCT/DE99/02419

§ 371 (c)(1),
(2), (4) Date: Feb. 2, 2001

(87) PCT Pub. No.: WO00/10292

PCT Pub. Date: Feb. 24, 2000

(30) Foreign Application Priority Data

Aug. 12, 1998 (DE) .......................................... 198 36 609

(51) Int. Cl.⁷ .............................................. H04M 11/00
(52) U.S. Cl. ............................... 379/93.33; 379/93.28; 379/90.01; 455/465; 370/468
(58) Field of Search .......................... 379/93.33, 93.28, 379/93.29, 93.31, 93.32, 93.01; 375/219, 220, 222, 225, 377; 455/557, 465; 370/468, 252

(56) References Cited

U.S. PATENT DOCUMENTS

| 5,142,538 A | | 8/1992 | Fickes et al. |
| 5,412,650 A | * | 5/1995 | Davies ........................ 370/347 |
| 6,122,498 A | * | 9/2000 | Sipila ........................ 455/465 |

FOREIGN PATENT DOCUMENTS

| DE | 195 45 767 | 6/1996 |
| DE | 297 14 588 | 11/1997 |
| EP | 0 836 339 A2 | 4/1998 |
| WO | WO 96/38991 | 12/1996 |
| WO | WO 97/41700 | 11/1997 |

OTHER PUBLICATIONS

Infomatik Spektrum—Der GSM–Standard (1991) 14: 137–152—A. Mann.
Struktur des DECT–Standards—42 (1992) Jan./Feb. P. 23–29—Pilger.
European Telecommunication Standard—ETS 300 175–1 DECT.
International Telecommunication Union ITU–T V. 24.
GSM Funkschnittstelle—Bonn.
Hochoptimierte Ics für DECT–Schnurlos–telefone—Althammer—Brükmann.
TDMA—Falconer et al—Multiple Access Technique.
DECT Data Services—Elberse et al—DECT in Fixed and Mobile Networks Jun. 17 & 18 96.
DECT Forum The standard explained Feb. 1997.
Ringen um die UMTS—Schnittstelle.

* cited by examiner

Primary Examiner—Melur. Ramakrishnaiah
(74) Attorney, Agent, or Firm—Bell Boyd & Lloyd LLC

(57) ABSTRACT

In a wireless V.24 data transmission system operating between a data terminal and a data transmission device for data telecommunication having a first data transmission apparatus connected to the data terminal by means of a V.24 cable and a second data transmission apparatus connected to the data terminal by means of a V.24 cable, the apparatus may in turn be connected for wireless communication by means of an air interface. In order to control data transmission in such a way that baud rate changes can be easily detected, the baud rate is detected by the first data transmission apparatus while the autobauding function is activated in the first data transmission apparatus and in the data transmission device. The baud rate is transmitted by signaling to the second data transmission apparatus and is regulated therein parallel to the command data (AT commands) to be sent.

5 Claims, 3 Drawing Sheets

METHOD FOR CONTROLLING DATA TRANSMISSION IN A WIRELESS V.24 DATA TRANSMISSION SYSTEM OPERATING BETWEEN A DATA TERMINAL AND A DATA TRANSMISSION DEVICE FOR DATA TELECOMMUNICATION

BACKGROUND OF THE INVENTION

Data telecommunication (datel) is the mutual sending and receiving of data or data signals (packet data) between a data terminal equipment item—e.g. personal computer, data terminals, DP systems etc.—and a remote data terminal equipment unit—e.g. personal computer, data terminals, DP systems etc.—via a telecommunication network, for example a public telecommunication network (ISDN, PSTN etc.). So that the data or data signals sent by the data terminal equipment unit can be transmitted via the telecommunication network, a network facility, the so-called data communication equipment unit, is provided between the data terminal equipment unit and the telecommunication network. Apart from the PC card (previously: PCMCIA card), the most widely used data communication equipment item is the modem (made up of modulator/demodulator) [compare also the utility model DE 297 14 588 U1].

The modem is an electrical data communication equipment unit operating on the basis of the carrier-current method for use on analog transmission paths of limited bandwidth—e.g. telecommunication lines (e.g. a/b circuit pair, ISDN-$S_O$-BUS etc.) of the telecommunication network which converts digital data signals into analog data signals and conversely and transmits them. Furthermore, a multiplicity of methods of the V series standardized by the International Telecommunication Union - Telecommunication Standards (ITU-T) - are implemented in modems.

FIG. 1 shows a data telecommunication scenario based on a V.24 data transmission system. A V.24 data transmission system is connected to a remote V.24 data transmission system via a public telecommunication network, for example a PSTN (Public Switched Telecommunication Network) exhibiting an a/b circuit pair or an ISDN (Integrated Services Digital Network) exhibiting an ISDN-$S_O$-bus. The V.24 data transmission system exhibits a data terminal equipment unit DTE constructed, for example, as personal computer and a data communication equipment unit DCE constructed, for example, as a modem, which are connected to one another via a V.24 cable (V.24 interface) $K_{V.24}$.

Analogously to the above, the remote V.24 data transmission system exhibits a remote data terminal equipment unit $DTE_r$ constructed, for example, as a personal computer and a remote data communication equipment unit $DCE_r$ constructed, for example, as a modem which are also connected to one another via a V.24 cable (V.24 interface) $K_{V.24}$.

The data terminal equipment unit DTE, $DTE_r$ contains a system controller SST with a user interface BOF, application software ASW and a driver TR as an interface adapter between software (application software) and hardware (data communication equipment unit or, respectively, modem).

The driver TR is specific to the modem manufacturer and preferably constructed as CAPI (Common ISDN Application Programmable Interface; standardized communication interface for user software for the error-tolerant ISDN telecommunication with the personal computer) driver or as TAPI (Telephone Application Programmable Interface) driver.

A plurality of the data communication equipment units DCE which can be obtained on the market, e.g. analog modems and ISDN terminal adapters external to the PC are controlled via a HAYES instruction set (or HAYES standard). The HAYES standard was originally an American industry standard for modem communication, especially for modem control by the data terminal equipment unit DTE. It is also called the AT standard because almost all instructions of the HAYES instruction set begin with the prefix "AT" (Attention) comprising the ASCII characters A and T. The standard which, in the meantime, has been introduced throughout the world, is the subject matter of an ITU Recommendation (International Telecommunication Union) designated by "ITU-T V.25ter". Instead of the prefix "AT", the prefix "at", the prefix "A/" or the prefix a/" can also be used.

In these modems, the modem driver TR of the data terminal equipment unit DTE changes the baud rate at the V.24 interface depending on the data transmission phase (e.g. connection set-up, negotiation of the transmission parameters etc.). This change in baud rate is transmitted via the V.24 cable $K_{V.24}$ to the data communication equipment unit or modem, respectively, DCE, but not by means of signaling. Thus, the modem DCE must automatically detect the newly set baud rate and adapt itself to the driver TR (autobauding). The relevant rule is: the baud rate at which the "AT" character sequence is transmitted is valid until the next "AT" character sequence is received.

This autobauding is active in the modems until the modem has changed into the user data transmission mode, or the so-called "transparent mode" after a connection set-up. In this mode, a "point-to-point" connection ("end-to-end" connection) exists with the remote data communication equipment unit or, respectively, remote modem $DCE_r$. Autobauding is then switched off so that "AT" character sequences are not interpreted in the user data stream and there is possibly an unwanted change in baud rate at the modem.

The V.24 cable or, respectively, V.24 interface $K_{V.24}$ supports the modem operation on a personal computer by means of various lines (status lines) in accordance with ITU-T Specification V.24, March 1993, pages 1 to 19. These lines are:

1. A transmit data line TxD for data transmission,
2. a receive data line RxD for data transmission,
3. an RTS (Ready To Send) line RTS for the "hardware handshake" type of transmission for transmitting the "READY TO SEND" state ("RTS" state),
4. a CTS (Clear To Send) line CTS for the "hardware handshake" type of transmission for transmitting the "CLEAR TO SEND" state ("ICTS" state),
5. an RI (Ring Indication) line RI for detecting ringing at the modem,
6. a DSR (Data Set Ready) line DSR on which the modem reports to the personal computer that it is switched on,
7. a DTR (Data Terminal Ready) line DTR on which the personal computer reports to the modem that it is switched on and is ready to accept calls,
8. a DCD (Data Channel Detection) line DCD on which the modem reports to the personal computer that it has accepted and set up the connection to a remote modem,
9. a ground (GrouND) line GND.

If the V.24 cable or V.24 interface $K_{V.24}$ does not have the nine lines listed above but has fewer than nine, e.g. seven, this 7-wire cable can still support the modem operation on the personal computer. This is possible due to the fact that, instead of the "hardware handshake" on the RTS/CTS lines, a "software handshake" type of transmission is performed for transmitting the "RTS", "CTS" states—e.g. by means of an XON/XOFF protocol - on the transmit/receive data lines TxD, RxD. In the "software handshake", the data stream transmitted between the data terminal equipment unit DTE and the data communication equipment unit DCE is analyzed in the data terminal equipment unit DTE and the data communication equipment unit DCE, all "software handshake signals" are interpreted and measures are correspondingly initiated.

For an application scenario in which the data terminal equipment unit DTE and the data communication equipment unit DCE are spatially separated from one another, e.g. by several meters, the cord-connected V.24 data transmission system shown in FIG. 1 exhibits the disadvantage that first, a V.24 cable $K_{V.24}$, the length of which corresponds to the spatial arrangement of data terminal equipment unit DTE and data communication equipment unit DCE, is required for the data telecommunication and, secondly, a large, not inconsiderable effort is expended for running the cable for the installation of the system with such cable lengths.

Analogously to cordless telephony, it is therefore desirable and also imaginable to replace the cord-connected V.24 data transmission system according to FIG. 1 with a cordless V.24 data transmission system.

On the basis of FIG. 1, FIG. 2 shows such a cordless V.24 data transmission system for data telecommunication. The remote V.24 data transmission system, not completely shown in FIG. 2, can either be cord-connected according to FIG. 1 or cordless like the cordless V.24 data transmission system in FIG. 2. Compared with the cord-connected V.24 data transmission system in FIG. 1, the V.24 cable or V.24 interface $K_{V.24}$ between the data terminal equipment unit DTE and the data communication equipment unit DCE are split apart compared with the cord-connected V.24 data transmission system in FIG. 1 and are connected at the two ends of the cable caused by the splitting to in each case one data transmission device.

The two data transmission devices, a first data transmission device DTD1 connected to the data terminal equipment unitm DTE by the V.24 cable or V.24 interface $K_{V.24}$ and a second data transmission device DTD2 connected to the data communication equipment unit DCE by the V.24 cable or V.24 interface $K_{V.24}$ are connected to one another by an air interface LSS for wireless telecommunication.

Air interfaces are wireless telecommunication interfaces in which messages are transmitted via a remote transmission link between a message source (e.g. first data transmission device DTD1) and a message sink (e.g. second data transmission device DTD2) wirelessly on the basis of various message transmission methods FDMA (Frequency Division Multiple Access), TDMA (Time Division Multiple Access) and/or CDMA (Code Division Multiple Access)—e.g. in accordance with radio standards such as DECT [Digital Enhanced (previously: European) Cordless Telecommunication; compare Nachrichtentechnik Elektronik 42 (1992) Jan./Feb. No. 1, Berlin, DE; U. Pilger "Struktur des DECT-Standards" [Structure of the DECT standard], pages 23 to 29 in conjunction with ETSI publication ETS 300175-1 . . . 9, October 1992 and DECT publication of the DECT Forum, February 1997, pages 1 to 16], GSM [Groupe Spéciale Mobile or Global System for Mobile Communication; compare Informatik Spektrum 14 (1991) June, No. 3, Berlin, DE; A. Mann: "Der GSM-Standard - Grundlage fur digitale europäische Mobilfunknetze" [The GSM standard - basis for digital European mobile radio networks], pages 137 to 152 in conjunction with the publication telekom praxis 4/1993, P. Smolka "GSM-Funkschnittstelle - Elemente und Funktionen" [The GSM radio interface - elements and functions], pages 17 to 24], UMTS (compare Funkschau 6/98: R. Sietmann "Ringen um die UMTS-Schnittstelle" [Fighting for the UMTS interface], pages 76 to 81) WACS or PACS, IS-54, IS-95, PHS, PDC etc. (compare IEEE Communications Magazine, January 1995, pages 50 to 57; D. D. Falconer et al.: "Time Division Multiple Access Methods for Wireless Personal Communications").

The air interface LSS provided in FIG. 2 is preferably the DECT air interface. According to the publication "Vortrag von A. Elberse, M. Barry, G. Fleming zum Thema: [lecture by A. Elberse, M. Barry, G. Fleming on the subject]: DECT Data Services - DECT in fixed and mobile networks", 17/18 June 1996, Sofitel Hotel, Paris; pages 1 to 12 ; and summary", on the basis of the printed document "Nachrichtentechnik Elektronik 42 (1992) Jan./Feb. No. 1, Berlin, DE; U. Pilger "Struktur des DECT-Standards", (Structure of the DECT standard), pages 23 to 29 ;in conjunction with ETSI publication ETS 300175-1 . . . 9, October 1992 and the printed documents Components 31 (1993), Vol. 6, pages 215 to 218; S. Althammer, D. Bruackmann: "Hochoptimierte IC's für DECT-Schnurlostelefone" [Highly optimized ICs for cordless DECT telephones] and WO 96/38991 (compare FIGS. 5 and 6 with the respectively associated description) - the DECT technology is suitable for the basic applicability of the DECT tecyhnology (Digital Enhanced Cordless Telecommunication) for the wireless mobile remote transmission of voice and/or packet data in which the user can both become his own network operator and also has an access capability to a high-level telecommunication network due to the DECT network access technology with respect to the remote transmission of user data.

If it is intended to replace a V.24 cable link, e.g. between a personal computer and a modem, by means of a cordless data transmission link according to FIGS. 1 and 2, it is also necessary to offer the feature of "autobauding" (automatic baud rate detection at the V.24 interface) normally used in modems at the cordless data transmission link so that the modem drivers supplied with a modem can still be used and a change in baud rate can thus be detected.

SUMMARY OF THE INVENTION

An object of the invention is to control the data transmission in a cordless V.24 data transmission system operated between a data terminal equipment unit and a data communication equipment unit meant for the purpose of data telecommunication, in such a manner that a change in baud rate can be detected in a simple manner.

According to the method of the present invention for controlling data transmission in a cordless V.24 data transmission system operated between a data terminal equipment unit in a data communication equipment unit for data telecommunication, the V.24 data transmission system has a first V.24 data transmission device and a second V.24 data transmission device connected to one another via an air interface. The first V.24 data transmission device is connected to the data terminal equipment unit. The second V.24 data transmission device is connected to the data communication equipment unit and the data communication equipment unit is connected to a remote data communication equipment unit with a downstream remote data terminal equipment unit. When the data terminal equipment unit, the data communication equipment unit, and the V.24 data transmission devices are switched on, the V.24 data transmission devices, the data terminal equipment unit, and the data communication equipment unit are operated in an instruction data transmission mode. In the instruction data transmission mode, the data terminal equipment unit transmits instruction data at different baud rates depending on data transmission phase. When an autobauding function is activated, the first V.24 data transmission device detects that instruction data have been transmitted at different baud rates or that a change in buad rate has taken place. The respective buad rate is transmitted to the second V.24 data transmission device by means of signaling, and the instruction data sent by the data terminal equipment unit with the different buad rates is transmitted to the second V.24 data transmission device. The second V.24 data transmission device sets the baud rates received from the first V.24 data transmission device in parallel with the received instruction data and transmits the instruction data thus set to the data communication equipment unit. When the autobauding function is activated, the data communication equipment unit detects that the instruction data have been transmitted at different buad rates or that a change in baud rate has taken place.

An idea of the invention is that in a cordless V.24 data transmission system operated between a data terminal equipment unit (e.g. a personal computer) and a data communication equipment unit (e.g. a modem) for the purpose of data telecommunication, with a first data transmission device connected to the data terminal equipment unit via a V.24 cable and with a second data transmission device connected to the data communication equipment unit via a V.24 cable, which, in turn, can be connected via an air interface by wireless telecommunication, a change in baud rate is detected in that, when the autobauding function is activated in a first data transmission device and in the data communication equipment unit, the baud rate in each case detected by the first data transmission device is transmitted to the second data transmission device by means of signalling and is there set in parallel with instruction data (AT instructions) to be sent out.

DESCRIPTION OF THE PREFERRED EMBODIMENT

Figure 1:
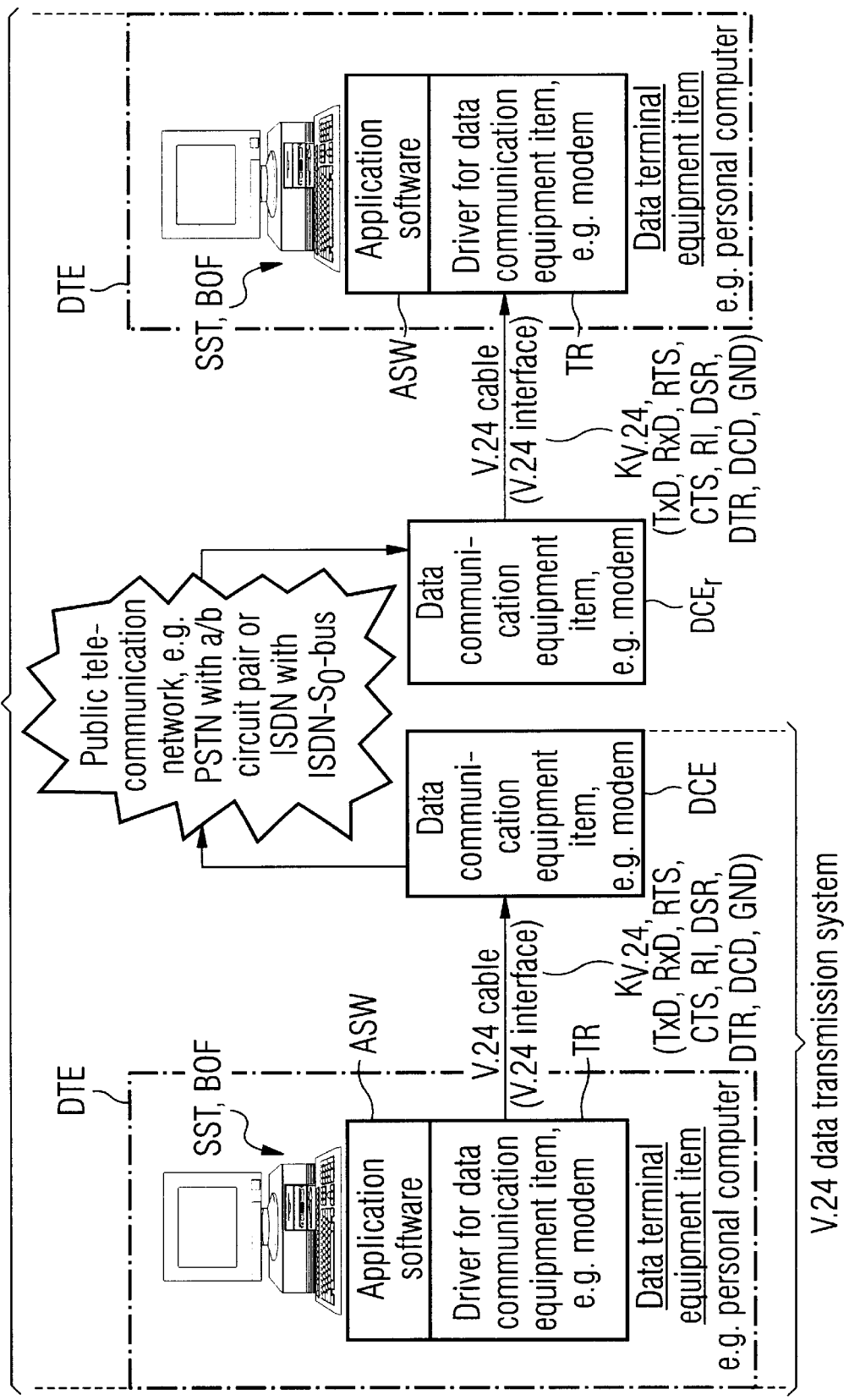
FIG. 1 shows a block diagram of a data telecommunication system based on a V.24 data transmission system according to the prior art.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art ot which the invention relates.

A first exemplary embodiment of the invention will be explained with reference to FIG. 3.

Figure 2:
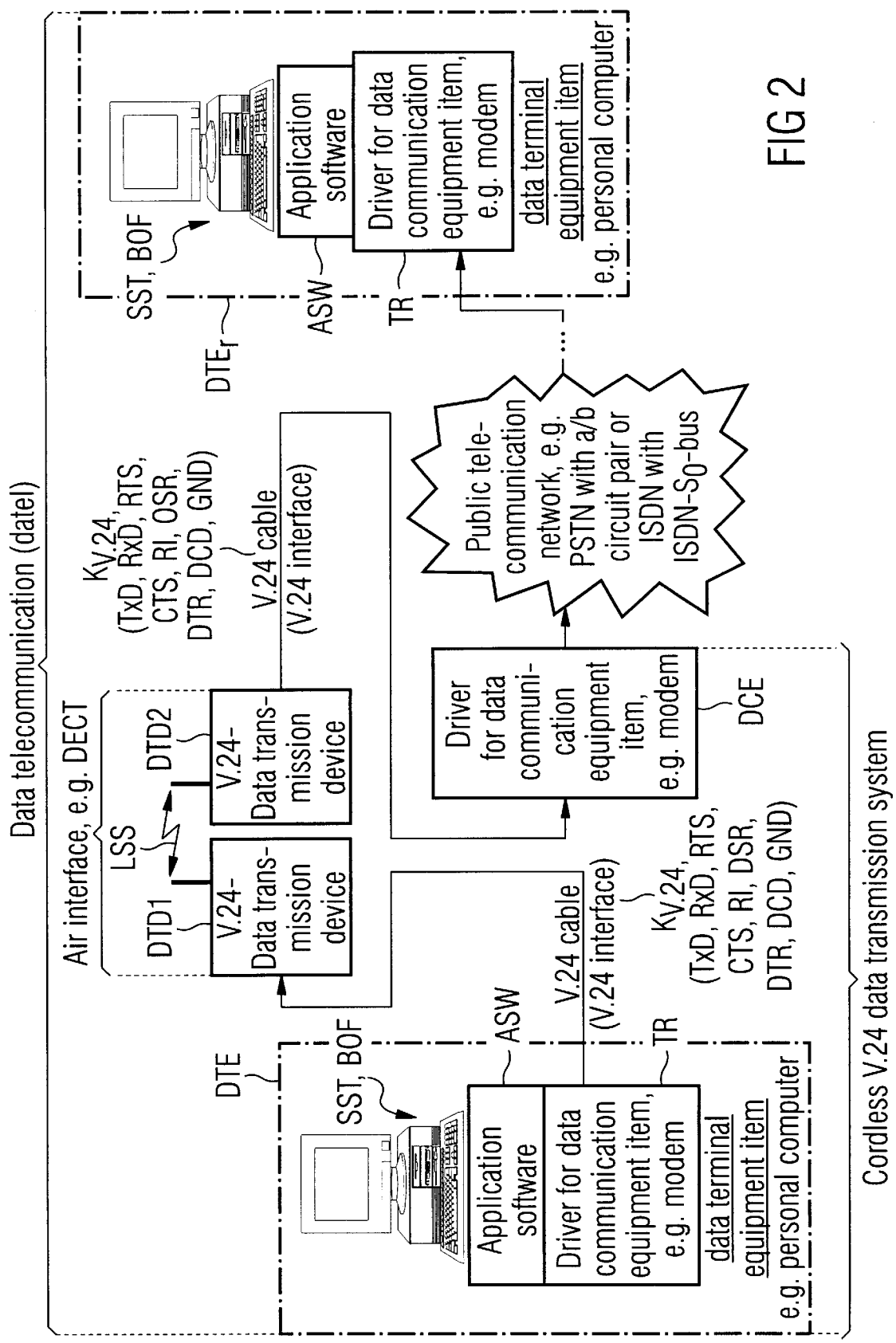
FIG. 2 shows a block diagram of a cordless V.24 data transmission system for data telecommunication according to the prior art.
Figure 3:
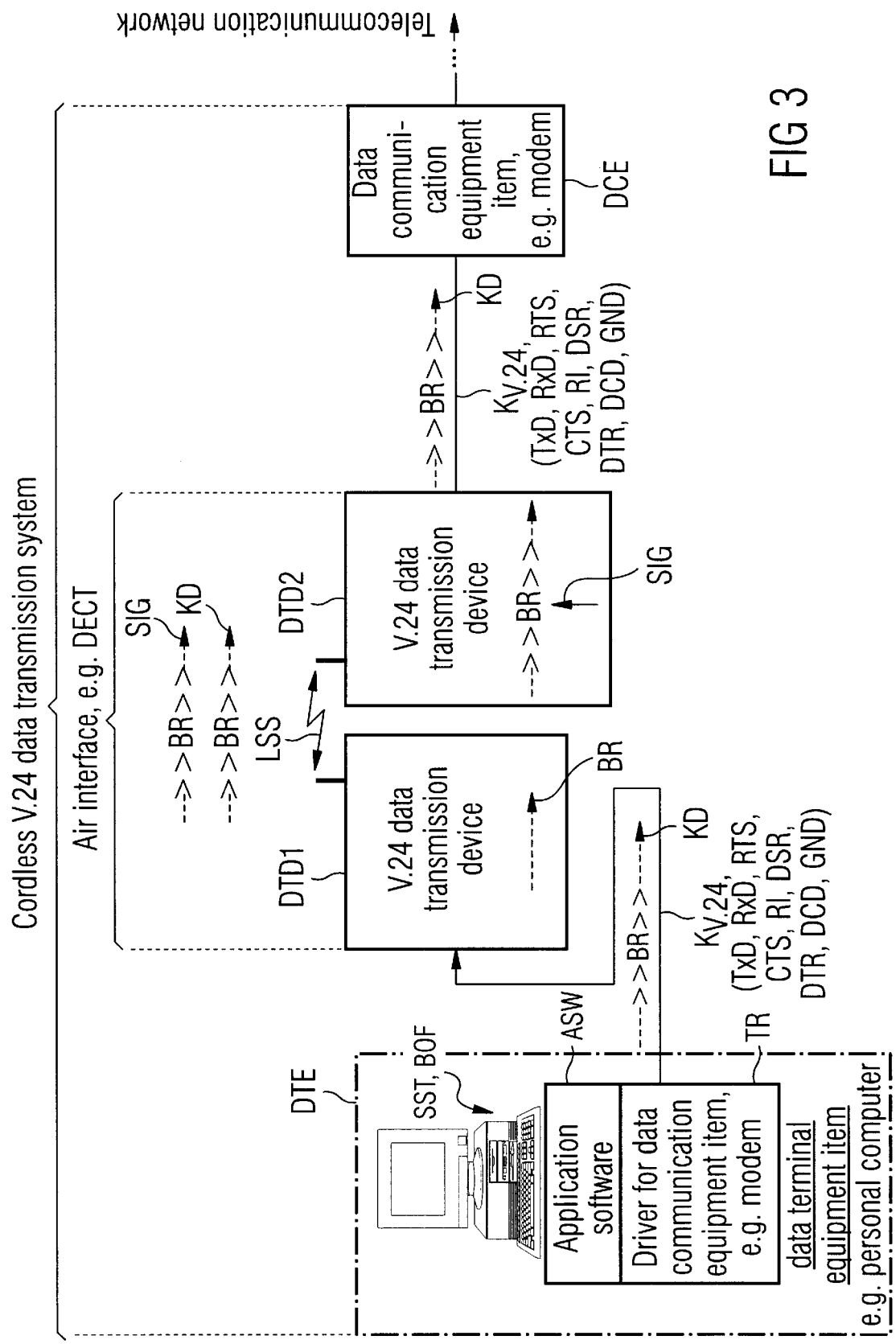
FIG. 3 shows a cordless V.24 data transmission system in block diagram format according to the present invention.

FIG. 3 shows the cordless V.24 data transmission system according to FIG. 2 in which the data transmission is controlled as follows:

When the data terminal equipment unit DTE, the data communication equipment unit DCE and the V.24 data transmission devices DTD1, DTD2 are switched on, the V.24 data transmission devices DTD1, DTD2, the data terminal equipment unit DTE and the data communication equipment unit DCE are operated in an instruction data transmission mode.

In the instruction data transmission mode, the data terminal equipment unit DTE transmits instruction data KD at different baud rates BR depending on the data tranmission phase.

When the autobauding function is activated, the first V.24 data transmission device DTD1 detects that the instruction data KD have been transmitted at different baud rates BR or, respectively, that a change in baud rate has taken place, transmits the respective baud rate BR to the second V.24 data transmission device DTD2 by means of signalling SIG and transmits the instruction data KD sent by the data terminal equipment item with the different baud rates BR to the second V.24 data transmission device DTD2.

The second V.24 data transmission device DTD2 sets the baud rates BR received from the first V.24 data transmission device DTD1 in parallel with the received instruction data KD and transmits the instruction data KD thus set to the data communication equipment unit DCE.

When the autobauding function is activated, the data communication equipment item DCE detects that the instruction data KD have been transmitted at different baud rates BR or, respectively, that a change in baud rate has taken place.

While the invention has been illustrated and described in detail in the drawings and foregoing description, the same is to be considered as illustrative and not restrictive in character, it being understood that only the preferred embodiment has been shown and described and that all changes and modifications that come within the spriti of the invention are desired to be protected.

We claim:

1. A method for controlling data transmission in a cordless V.24 data transmission system operated between a data terminal equipment unit and a data communication equipment unit for data telecommunication, the V.24 data transmission system having a first V.24 data transmission device and a second V.24 data transmission device connected to one another via an air interface, the first V.24 data transmission device being connected to the data terminal equipment unit, the second V.24 data transmission device being connected to the data communication equipment unit, and the data communication equipment unit being connected to a remote data communication equipment unit with a downstream remote data terminal equipment unit, comprising the steps of:

when the terminal equipment unit, the data communication equipment unit and the V.24 data transmission devices are switched on, operating the V.24 data transmission devices, the data terminal equipment unit and the data communication equipment unit in an instruction data transmission mode;

in the instruction data transmission mode, with the data terminal equipment unit, transmitting instruction data at different baud rates depending on data transmission phase;

when an autobauding function is activated, with the first V.24 data transmission device detecting that instruction data have been transmitted at different baud rates or that a change in baud rate has taken place, transmitting the respective baud rate to the second V.24 data transmission device by means of signaling, and transmitting the instruction data sent by the data terminal equipment unit with the different baud rates to the second V.24 data transmission device;

with the second V.24 data transmission device, setting the baud rates received from the first V.24 data transmission device in parallel with the received instruction data and transmitting the instruction data thus set to the data communication equipment unit; and when the autobauding function is activated, with the data communication equipment unit detecting that the instruction data have been transmitted at different baud rates or that a change in baud rate has taken place.

2. The method of claim 1 wherein the instruction data are Hayes-related instructions with a Hayes prefix "AT" Attention.

3. The method of claim 1 wherein a modem is used as the data communication equipment unit and a personal computer is used as the data terminal equipment unit.

4. The method of claim 1 wherein a DECT air interface is used as the air interface.

5. A method for controlling data transmission in a cordless data transmission system operated between a data terminal equipment unit and a data communication equipment unit for data telecommunication, the data transmission system having a first data transmission device and a second data transmission device connected to one another via an air interface, the first data transmission device being connected to the data terminal equipment unit, the second V.24 data transmission device being connected to the data communication equipment unit, and the data communication equipment unit being connected to a remote data communication equipment unit with a downstream remote data terminal equipment unit, comprising the steps of:

when the terminal equipment unit, the data communication equipment unit and the data transmission devices are switched on, operating the data transmission devices, the data terminal equipment unit and the data communication equipment unit in an instruction data transmission mode;

in the instruction data transmission mode, with the data terminal equipment unit, transmitting instruction data at different baud rates depending on data transmission phase;

when an autobauding function is activated, with the first data transmission device detecting that instruction data have been transmitted at different baud rates or that a change in baud rate has taken place, transmitting the respective baud rate to the second data transmission device by means of signaling, and transmitting the instruction data sent by the data terminal equipment unit with the different baud rates to the second data transmission device;

with the second data transmission device, setting the baud rates received from the first data transmission device in parallel with the received instruction data and transmitting the instruction data thus set to the data communication equipment unit; and when the autobauding function is activated, with the data communication equipment unit detecting that the instruction data have been transmitted at different baud rates or that a change in baud rate has taken place.

* * * * *